R. MURDOCH.
Running-Gear.
No. 17,337.
Patented May 19, 1857
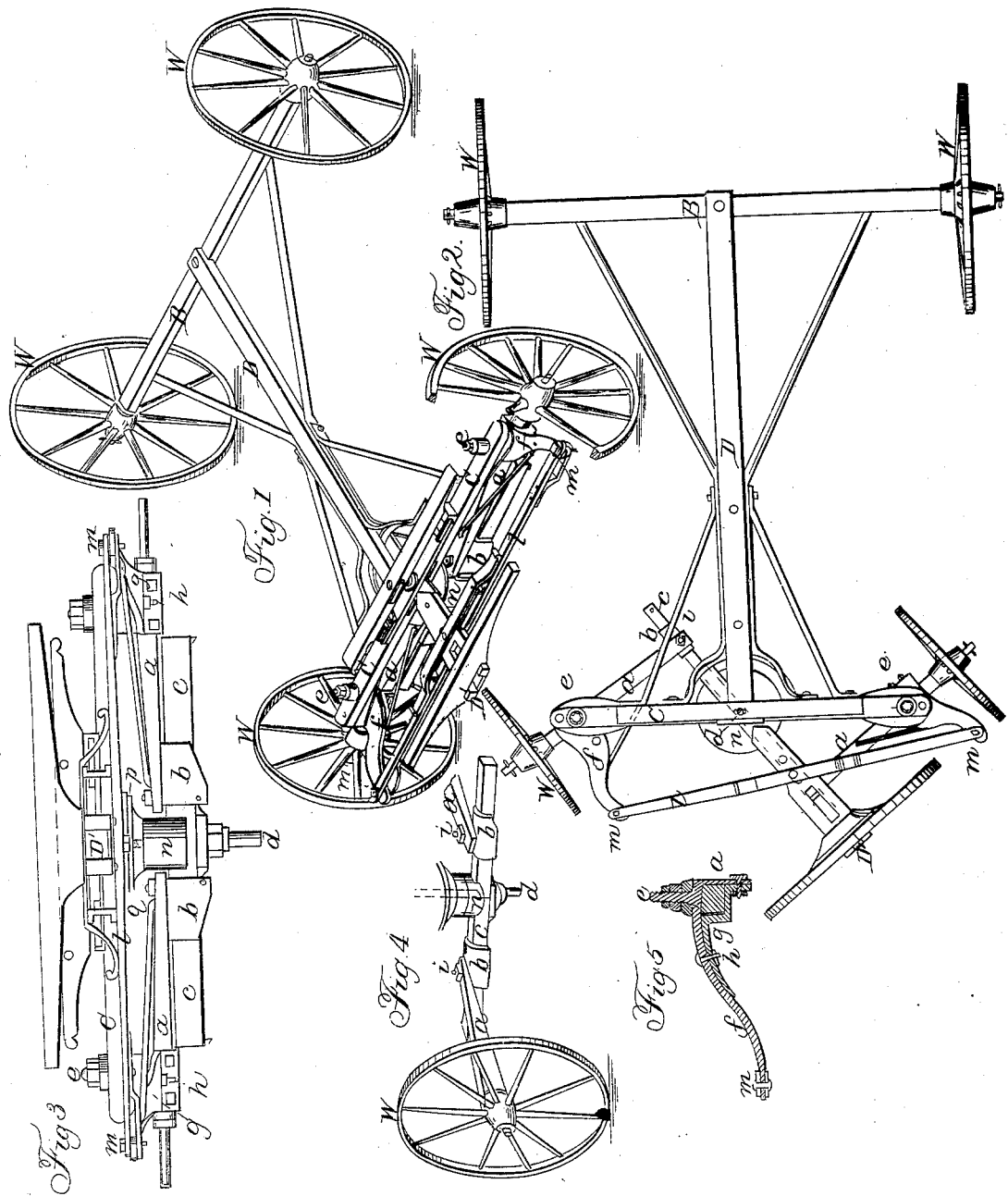

UNITED STATES PATENT OFFICE.

RICHARD MURDOCH, OF BALTIMORE, MARYLAND.

RUNNING-GEAR OF CARRIAGES.

Specification of Letters Patent No. 17,337, dated May 19, 1857.

*To all whom it may concern:*

Be it known that I, RICHARD MURDOCH, of the city of Baltimore and State of Maryland, have invented a new and useful Improvement in the Running-Gear of Vehicles; and I do hereby declare that the following is a full, clear, and exact description of the construction and operation of the same, reference being had to the annexed drawings, forming part of this specification, in which—

Figure 1, is a perspective view of my improved running gear; Fig. 2, is a plan, showing the short axles in oblique position; Fig. 3, is a front view of the fore cross bar and axles and their attachments; Fig. 4 is a detail view showing the manner in which the short axles are attached to the swivel bar; and Fig. 5 shows the strap attachment of the axles.

The same letter of reference denotes the same part in all the figures.

The nature of my invention consists in giving to the brace levers which project from the short axles a forward and outward inclination so that the angles at their junction with the inner arm of the short axles shall be obtuse; the object being to make the axial lines of the axles converge, when the vehicle is turning, to the common center of the circles, or arcs of circles, which form the paths of the wheels, while, at the same time, a larger range of motion is secured to the axle, enabling the vehicle to be turned in a smaller space, with greater control over the wheels, less strain upon the tongue, and greater regularity in the motion of the wheels than in any plan hitherto adopted for the same purpose.

In the drawings W, W, are the wheels; B, the rear axle; C, the fore cross bar, and D, the pole of the vehicle. The fore wheels are mounted upon the short axles $a$, $a$, on whose inner extremities are boxes $b$, $b$, capable of sliding on a swivel bar $c$, which is movable about the axis of the bolt $d$. These axles are attached to the extremities of the cross bar C, by bolts $e$, passing through the brace lever $f$ which is fastened by a strap to the axle as seen in Fig. 5. The inner extremities of the axles are attached to the boxes $b$, by a loose connection $i$, which permits the free movement of the box along the bar as the axle is turned about its attachment to the cross lever C.

The brace levers $f$, $f$, are so placed as to project forward and outward, forming an obtuse angle with the line of the cross bar C, when the vehicle is not turned from a straight line. The effect of this arrangement is, when the vehicle is turning, to give a greater lateral motion to the short axle on the inner side of the vehicle, so that if the axes of the two axles were produced they would meet at a point which would be the common center of the circles, or segments of circles, described by the fore wheels when the vehicle is turning. It is obvious that the same effect would be produced by projecting the brace levers backward and inward, and placing the bar $l$, behind the cross piece C, and attaching it to a rearward prolongation of the pole socket D′; but the range of operation would be more limited and the arrangement therefore less efficient.

A portion of the axle $a$, is embraced by the brace lever $f$, and strap $g$, secured by bolts $h$, as shown. The lever braces $f$, are connected with each other and with the tongue or pole D′, by bar $l$,—bolts $m$, uniting these parts. By this connection of the pole D′, with the lever brace $f$, the movement of the axles is produced, the swivel bar $c$, turning with the movement of the axles as shown in Fig. 2. By the connection of the inner ends of the axles with the bar $c$, the axles are supported in every position they may assume, with the bracing requisite to insure the strength of the system. This obviates the necessity for stationary ways to support the ends of the axles in their travel; and gives the strength which is wanting in those constructions where the ends of the axles are left unsupported, thus combining the strength of the former, with the free motion of the latter construction. The bolt and strap connection gives a simple mode of attaching the axle to the cross bar, which is easily renewed when, from wear, the connection becomes loose. The swivel bar $c$, is connected with bolt $d$, by being let into a cylindrical piece $n$, secured to plate $p$, in which bolt $d$, is fixed as shown in Fig. 3, the upper portion of bolt $d$, passing through the stationary plate $q$, and cross piece C. This connection may be varied in any manner that will allow free movement to the swivel bar $c$.

I disclaim the short axles, and the manner of turning them about their attachment. I also disclaim supporting the extremities during their movement on stationary tramways. I also disclaim, in this specification, the swivel bar c, and boxes b, b, in combination with the short axles a, a, connected with the extremities of the cross bar as described, this having been secured to me by Letters Patent of the United States bearing date the 24th day of June A. D. 1856. I disclaim also all devices in which the fore wheels remain parallel to each other while the vehicle is turning. I disclaim projecting the brace levers backward and inward from the short axles, as that has been done before, and is inferior to my plan inasmuch as it has a more limited range of motion, and gives less control over the wheels, when turning, and greater irregularity in their motion, and increased strain upon the tongue. But What I do claim is—

Giving to the brace levers $f$, $f$, a forward and outward projection from the short axles substantially in the manner and for the purpose specified.

The above specification signed and witnessed this twenty first day of March 1857.

RICHARD MURDOCH.

Witnesses:
CHARLES W. WALKER,
A. H. PENINGTON.